United States Patent [19]

Hashimoto

[11] Patent Number: 4,673,597

[45] Date of Patent: Jun. 16, 1987

[54] SLIDING WAX

[75] Inventor: Shoji Hashimoto, Kosaka, Japan

[73] Assignee: Dowa Mining Co., Ltd., Tokyo, Japan

[21] Appl. No.: 858,898

[22] Filed: Apr. 25, 1986

Related U.S. Application Data

[62] Division of Ser. No. 694,244, Jan. 24, 1985, abandoned.

[51] Int. Cl.$^4$ .............................................. B05D 3/02
[52] U.S. Cl. .............................. 427/374.4; 427/376.1; 106/272
[58] Field of Search .......................... 427/374.4, 376.1; 280/610

[56] References Cited

U.S. PATENT DOCUMENTS

| | | | |
|---|---|---|---|
| 3,391,080 | 7/1968 | Buckley et al. | 252/26 |
| 3,405,063 | 10/1968 | Boes et al. | 252/12 |
| 4,093,268 | 6/1978 | Sampson et al. | 280/610 |
| 4,168,241 | 9/1979 | Kozima et al. | 252/18 |
| 4,272,577 | 6/1981 | Lyng | 280/610 |

OTHER PUBLICATIONS

Chem Abst 100: 36893r, Jul. 26, 1983, Toshiba Tungaloy.
Chem Abst 101: 113,748x, Apr. 26, 1984.
Chem Abst. 63:9719b, Durbridge, 1965.
Research Reviews, "Gallium Forms Unique Alloys" Denny, J. P., et al, pp 13-19, Nov. 1944.
Handbook of Chemistry & Physics, Hodgman, C. D. et al., pp. 576, 577, 610 & 611; 1959.

*Primary Examiner*—Theodore Morris
*Attorney, Agent, or Firm*—Shlesinger, Arkwright, Garvey & Fado

[57] ABSTRACT

Sliding wax such as ski wax is made from gallium or molybdenum disulfide. The wax having a low melting point can be applied to sliding apparatuses readily at sites where they are used, and the wax is advantageously applicable to any snow conditions.

12 Claims, No Drawings

SLIDING WAX

This application is a division of application Ser. No. 694,244, filed Jan. 24, 1985, now abandoned.

BACKGROUND OF THE INVENTION

This invention relates to wax which is applied on various sliding surfaces, such as the running surfaces of skis, for improving their sliding characteristics. The physical properties of wax, of this kind, especially ski wax is adjusted by selecting paraffin in accordance with the atmospheric temperature and snow temperature. Since the selection of the paraffin determines largely the winner or loser of a ski tournament, skiers and ski manufacturers make a frantic search for the proper wax composition, by measuring atmospheric and snow temperatures, just before the race start.

For popular skiers, there is available in the market wax which does not require specific adjustment of paraffin and can widely be used in various snow conditions. However, multipurpose wax of this kind adversely affects the sliding property of the skis, especially when it is used at the low atmospheric temperature at which the snow becomes powder, and the wax has a further drawback that the layer of it on the running surfaces of the skis comes off rather easily.

BRIEF SUMMARY OF THE INVENTION

In view of the above-mentioned background, this invention provides a sliding wax which is easy to deal with and gives excellent sliding characteristics, regardless of snow conditions. More particularly, this invention provides a sliding wax which is made from an element selected from the group consisting of gallium and molybdenum disulfide.

First, this invention is briefly explained further when gallium is employed. Metallic gallium, with a melting point of 29.6±1° C., a density of 5.91 g/cc, and a thermal conductivity of 0.29-0.38 (at 30° C.), is soft at low temperatures, glossy, and easy to handle in various shapes. In has been found in this invention that gallium, having the above-mentioned physical properties, can advantageously be employed as a ski wax. The wax can be applied to the running surfaces of skis readily and evenly, without hurting the surfaces. The wax can be applied on them by warming it in warm water when it is cold and can be applied on them in a thin layer with a minimum amount since it is malleable. It is advantageous also the metallic gallium, when applied on sliding surfaces, becomes harder when it abuts snow surfaces of a low temperature, whereby it has longer life than paraffin wax. Experiments show that wax made in accordance with this invention has good sliding performance under various snow conditions, viz. such as fresh snow, granulated snow, damp snow, and ice-up snow, which the conventional multipurpose wax can hardly attain.

While metallic gallium itself can provide good sliding performance, its melting point becomes reduced so that it becomes easier to deal with, its frictional resistance against snow surfaces becomes reduced so that skis can run faster, and its production cost becomes cheaper when it is alloyed with a specific amount of one or more of the metallic elements such as In, Zn, Sn, Al and others. The specific amount is 20-60 weight % for In, 10-20% for Zn, 10-30% for Sn, and 3-5% for Al. The balance is Ga, the composition of which with one or more of the aforementioned metallic elements in the above-mentioned specific amount can easily be mixed and melted at a temperature lower than 100° C., as shown by the phase diagrams of Ga with the metallic elements. Metallic elements other than the aforementioned metallic elements can be employed, provided that they can be alloyed with Ga, and melt at a temperature lower than 100° C.

As mentioned above, Ga alloys come to have a melting point lower than Ga itself, that is about 30° C. For example, a binary alloy of Ga (76%)-In (24%) has a melting point of 15.7° C., and a ternary alloy of Ga (82%)-Sn (12%)-Zn (6%) has a melting point as low as 17° C., whereby they become more easier to deal with. And, it is found to this end that the Ga content must be more than 60% when it constitutes a binary alloy, and more than 30% when it constitutes a ternary alloy. It is found also that the addition of Zn to Ga is effective, especially when atmospheric and snow temperatures are comparatively high.

One of the most advantageous points of the ski wax of this invention, which is made from Ga, is that it can be warmed by hands and softened so that it can be applied readily on the running surfaces of skis and then can be spread by a piece of gauze or sponge evenly over the surfaces. This work takes extremely less time than that required with the conventional ski wax. The conventional wax is applied by means of a burner or iron, shaved portionally so as to make it smooth, and is then applied again. This is quite laborious.

As mentioned above, it is an advantageous point of this wax that it can be safely used in tournaments, because it is hardly affected by snow conditions, as illustrated in the following Example 1.

Second, this invention is briefly explained further when molybdenum disulfide is employed.

Molybdenum disulfide, $MoS_2$, has an atomic structure in which a single Mo atom is sandwiched at its two lateral sides by two atoms of S, and belongs to a hexagonal system, and its molecules are cleavable from each other. Its grains have a flat form which is indeterminate but oval, and the thickness of which is about 1/20 of the length of the longitudinal axis thereof. Its color is silver-gray or black-gray, and it has a Mohs' scale hardness of 1-1.2, a specific gravity of 4.8-5.0, and a thermal conductivity of 0.328 cal. $cm^{-1}$ $deg^{-1}$. Though it is considered to be a semi-conductor, its outer membrane becomes conductive when it is strongly compressed. In addition, molybdenum disulfide has the characteristic that its resistance decreases when the temperature increases.

Molybdenum disulfide alone having the above properties, or its mixture with paraffin can provide, in this invention, wax which exhibits good sliding and coating characteristics. The characteristics are far superior to those of paraffin wax, and even superior to those of conventional multipurpose ski wax made from paraffin mixed with aluminium. While commercial powders of molybdenum disulfide have an average grain diameter of 0.5-5μ, it is preferable in this invention to use the powders having diameters less than about 1.0μ, because such powders have better affinity with paraffin and produce better sliding and coating characteristics.

Thus, it should be noted that while molybdenum disulfide alone can provide excellent ski wax, its mixture with paraffin can also provide wax which has good sliding characteristics which are comparable to those of wax which is prepared specifically for competition purposes. In fact, wax made from molybdenum disulfide and paraffin, in accordance with this invention, works best with damp and fasten snow.

DETAILED DESCRIPTION OF PREFERRED EMBODIMENTS

This invention is further described below by way of examples.

EXAMPLE 1

Comparative sliding tests were conducted between two kinds of conventional wax and the wax made in accordance with this invention.

They are as follows.

(a) Multipurpose ski wax, trade name TOKO and made in Switzerland, consisted of paraffin wax mixed with aluminum.

This multipurpose wax was applied on the running surfaces of a pair of skis. The wax was spreaded evenly over the surfaces by an iron, and the waxed surface was thinly shaved off. And, the wax was applied and spread once again, and finished.

(b) Competition wax of:

(b)-(1): The red and yellow competition waxes trade name of HOLMENKOL made in Germany, were mixed at a ratio of 1:1 by melting them by a burner. This mixed wax was twice applied on the running surfaces of skis as described in the above (a), and finished.

(b)-(2): The red and white competition waxes trade name TOKO and made in Switzerland were mixed at a ratio of 2:1 by melting them by a burner. The mixture was applied twice as described in the above (a), and finished.

(c) The wax of the invention:

Three waxes made in accordance with this invention, viz. one made from Ga alone, another of Ga 60%–In 40%, and further another of Ga 80%–Zn 20%, were each applied to the running surfaces of a pair of skis, and they were finished by being spread evenly over the surfaces with a piece of gauze.

Two skiers who were instructors of the All Japan Ski League and representative players at the Japan National Games wore the skies and tested them ten times. The test course had an average slant of 15° and a distance of 250 meters.

Average times required for the skies are as given in the following Table 1.

TABLE 1

| | | | | | (Time: second) |
|---|---|---|---|---|---|
| | | Skis with | | | |
| | | | | (c) This invention wax | |
| Snow conditions | (a) multi-purpose wax | (b) competition wax | | Ga alone | Ga—In 60:40 | Ga—Zn 80:20 |
| | | (b)-(1) | (b)-(2) | | | |
| atmospheric temperature −5° C. snow temperature −6° C. (snow condition) fresh snow | 24.73 | 21.24 | 21.39 | 21.14 | 20.97 | — |
| atmospheric temperature 0° C. snow temperature −1° C. (snow condition) powder snow | 22.50 | 20.61 | — | 21.24 | — | 20.12 |
| atmospheric temperature snow temperature (snow condition) damp snow | 23.16 | — | — | — | — | 21.51 |

EXAMPLE 2

The following three waxes, (a'), (b'), and (c'), were subjected to comparative tests.

(a') Conventional multipurpose wax comprising paraffin wax with aluminum mixture:

This wax was applied on the running surfaces of skis, and was spread with a cork block. Surfaces of wax were thinly shaved off. The above step was repeated.

(b') Competition wax:

Wax "white" and "yellow", trade names of a company, were mixed at a ratio of 1:1 by melting them. This mixed competition wax was applied on skis as in the above (a').

(c') The wax of the invention:

(c')-(1) wax was made from molybdenum disulfide alone, while (c')-(2) wax was prepared from the above (b') competition wax added with 30% of molybdenum disulfide. They were applied on skis as in the above (a') and (b').

Tests were made under the conditions that snow temperature was 0° C., weather was cloudy, and snow was damp and granulated. Results were as shown in the following Table 2.

TABLE 2

| | | | | (Time: second) |
|---|---|---|---|---|
| | | | (c') this invention wax | |
| | (a') multipurpose wax | (b') competition wax | (c')-(1) MoS₂ alone | (c')-(2) competition wax (b') added by MoS₂ |
| 1st run | 11.71 | 10.70 | 10.69 | 10.68 |
| 2nd run | 11.53 | 10.92 | 10.79 | 10.70 |
| average | 11.62 | 10.81 | 10.74 | 10.69 |

As readily seen in the Tables 1 and 2, wax made in accordance with this invention has better sliding capacities, compared to conventional ones. In addition, the wax of this invention can stand up well to various snow conditions, including fresh, damp, granulated, and iced snow. As the wax can be spread easily at low temperatures, one can promptly apply it to skis at the skiing grounds.

I claim:

1. A method of providing a sliding surface on ski's comprising:
   (a) softening by warming a solid material from the group consisting of gallium and molybdenum disulfide,
   (b) applying a thin layer of said softened material to said sliding surface; and,
   (c) subjecting said material to ambient temperature.

2. The method of improving the surface characteristics of the running surface of a ski, comprising the steps of:
   (a) selecting a solid material from the group comprising gallium and molybdenum disulfide;
   (b) softening said material by warming said material until malleable;
   (c) applying said softened material to the running surface of a ski; and,
   (d) hardening said applied material by chilling said material.

3. The method of claim 2, including the step of: (a) selecting said solid material from the group consisting of metallic gallium, galium alloyed with a member selected from the group indium, zinc, tin, aluminum and mixtures thereof, molybdenum disulfide and molybdenum disulfide mixed with paraffin.

4. The method of claim 3, including the step of:
   (a) selecting said gallium alloy from the group comprising binary gallium alloys and ternary gallium alloys.

5. The method of claim 2, including the step of:
   (a) spreading said softened material over the running surface with gauze.

6. The method of claim 2, including the step of:
   (a) hardening said material by contacting said material with snow.

7. A method of preparing a snow ski usable with various snow conditions, comprising the steps:
   (a) providing a snow ski having a running surface;
   (b) selecting a solid material from the group comprising gallium and molybdenum;
   (c) softening said selected material by warming said material until malleable;
   (d) applying said softened material to said running surface;
   (e) spreading said softened material in an even layer; and,
   (f) hardening said material by contacting said layer with snow.

8. The method of claim 7, including the step of:
   (a) selecting said material from the group comprising metallic gallium, gallium alloys comprising gallium alloyed with an element selected from the group indium, zinc, tin, aluminum and mixtures thereof, molybdenum disulfide and molybdenum disulfide mixed with paraffin.

9. The method of claim 8, including the step of:
   (a) selecting said gallium alloy from the group comprising binary gallium alloys comprising at least 60% gallium and ternary gallium alloys comprising at least 30% gallium.

10. The method of claim 7, including the step of:
    (a) softening said material by immersing said material in warm water and keeping said material immersed until malleable.

11. The method of claim 7, including the step of:
    (a) spreading said softened material with gauze.

12. The method of claim 8, including the step of:
    (a) selecting said gallium alloy from the group comprising alloys of gallium having as an alloying element a member selected from the group and comprising from about 20% to about 60% by weight indium, from about 10% to about 20% by weight zinc, from about 10% to about 30% by weight tin and from about 3% to about 5% by weight aluminum with the balance being gallium.

* * * * *